April 5, 1932.  C. S. BRAGG ET AL  1,852,285
BRAKE SYSTEM FOR AUTOMOTIVE VEHICLES
Filed Feb. 16, 1928  2 Sheets-Sheet 1
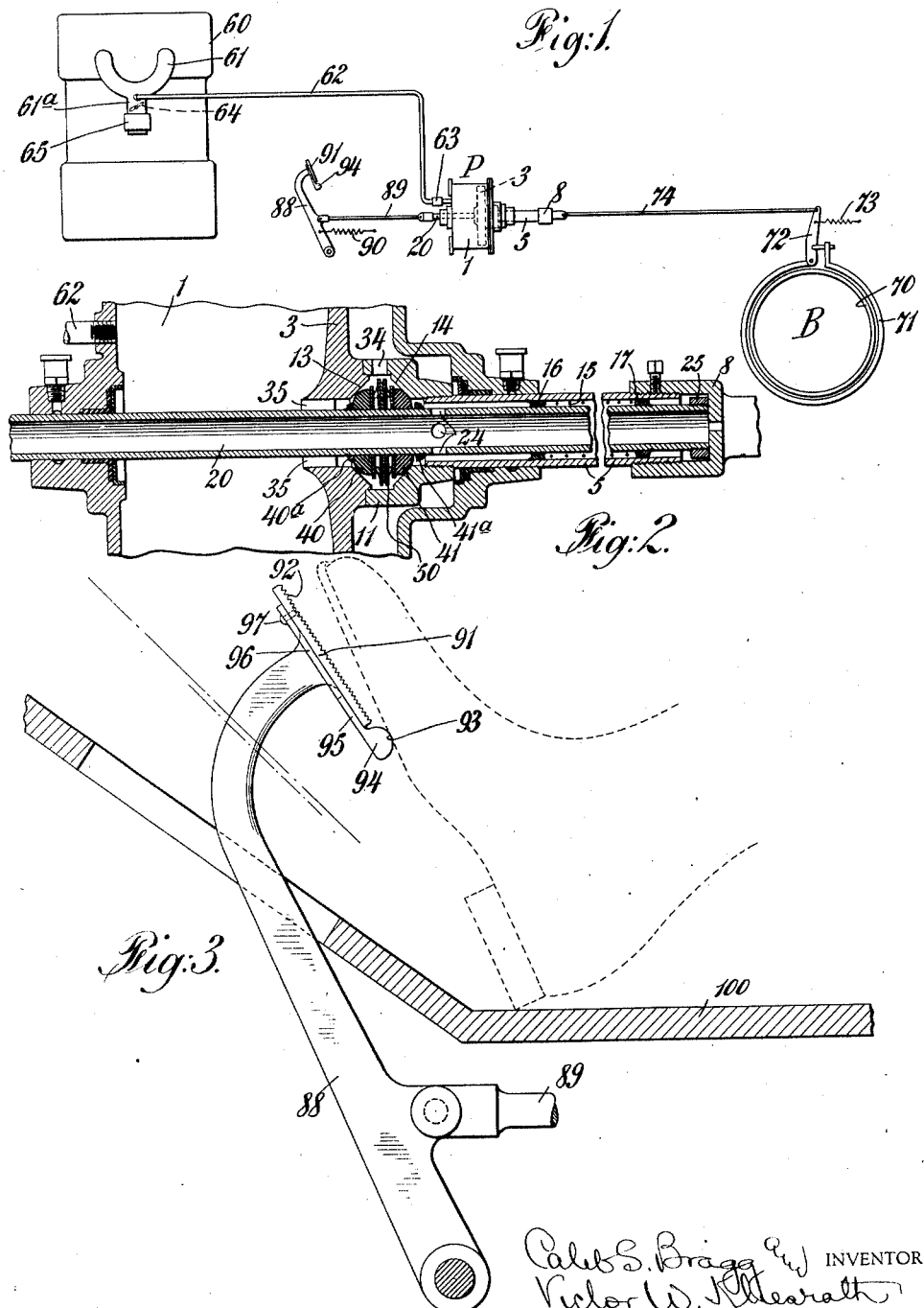

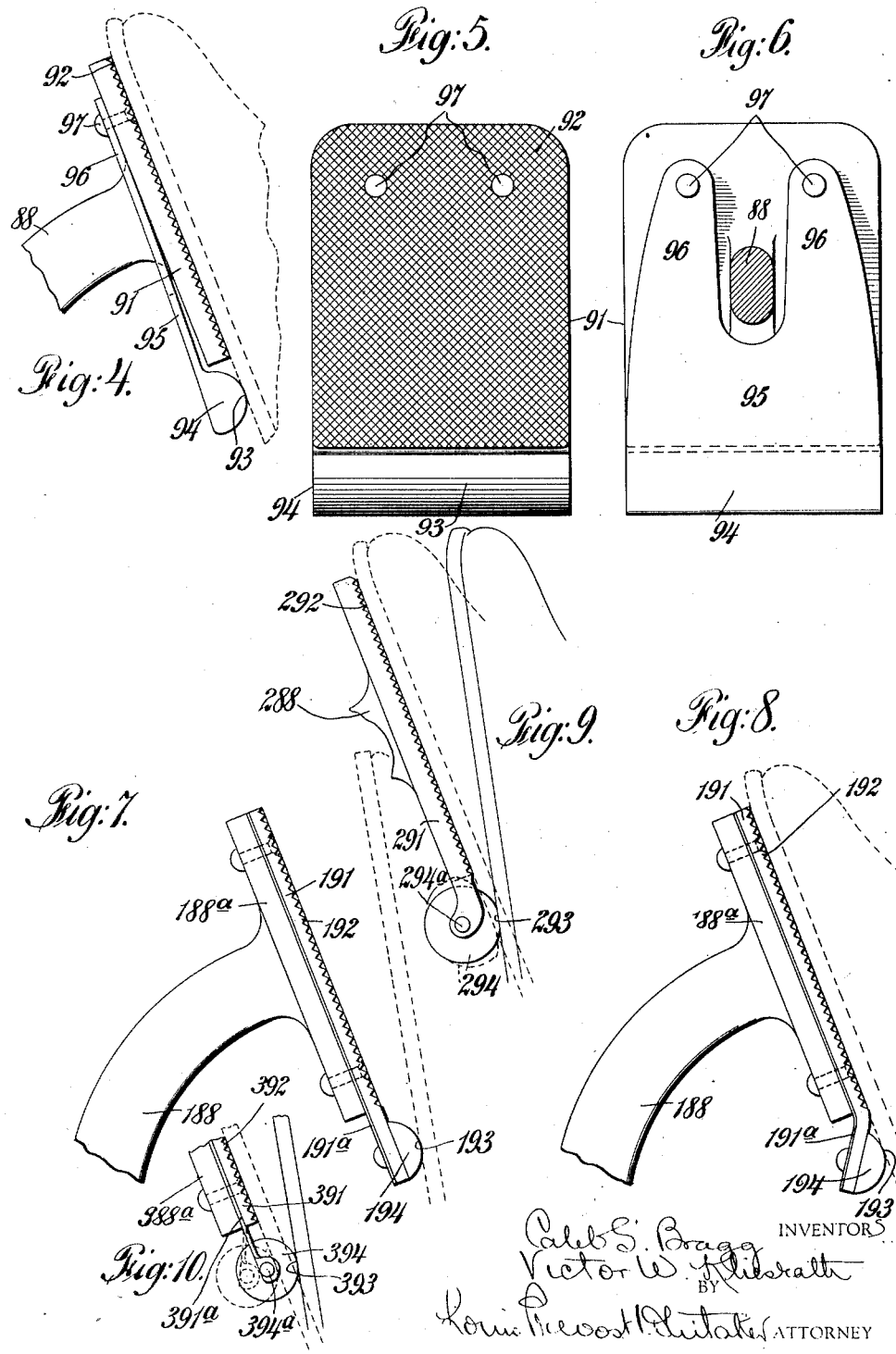

Patented Apr. 5, 1932

1,852,285

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed February 16, 1928. Serial No. 254,648.

Our invention consists in the novel features hereinafter described, reference being had to the accompanying drawings which show two embodiments of the same selected by us for purposes of illustration, and the said invention is fully disclosed in the following description and claims.

Our present invention consists in a novel foot pedal adapted particularly for use with a power actuator, for applying the brake mechanisms of an automotive vehicle, the foot pedal being connected with the controlling valve mechanism of the actuator and also with the brake mechanism (or other parts to be operated), so that the physical force of the operator may be applied thereto in addition to that of the actuator, or to operate said brake mechanisms in case of failure of power, the said foot pedal being provided with a primary "anti-friction" foot engaging portion constructed to engage the foot engaging portion, preferably of greater area than the said primary portion, and constructed to provide considerable friction between its face and the foot of the operator, the said primary or "anti-friction" foot engaging portion being constructed to yield with respect to the pedal, whenever subjected to more than a predetermined amount of pressure, as for example the amount of pressure required to effect the operation of the valve mechanism of the actuator, and automatically permit the foot of the operator to engage the secondary or friction foot engaging portion, as for example when it is desired to apply the physical force of the operator directly to the brake mechanism or other parts to be operated, in addition to that of the actuator, or to operate the brake mechanism by physical force alone in case of failure of power.

In the accompanying drawings which illustrate several embodiments of our invention selected by us for purposes of illustration, Fig. 1 is a diagrammatic view illustrating an installation of brake mechanism in an automotive vehicle in connection with a power actuator and a pedal lever embodying our present invention.

Fig. 2 is a detail sectional view of the controlling valve mechanism for the actuator illustrated in Fig. 1.

Fig. 3 is an enlarged detail view showing the pedal lever and a portion of the flooring of the vehicle, and illustrating the normal position of the operator's foot for controlling the valve mechanism of the actuator.

Fig. 4 is a detail view of a portion of the pedal lever showing the primary or anti-friction foot engaging portion displaced and the foot of the operator in engagement with the secondary or friction foot engaging portion.

Fig. 5 is an enlarged front view of the pedal portion of the lever showing the primary and secondary foot engaging portions.

Fig. 6 is a view of the rear face of the pedal portion.

Fig. 7 is an enlarged elevation of the pedal portion showing a slight modification, and illustrating the position of the foot in connection with the primary or anti-friction foot engaging portion.

Fig. 8 is a view similar to Fig. 7, showing the primary or anti-friction foot engaging portion displaced and the foot in engagement with the secondary or friction foot engaging portion.

Fig. 9 is a detail view showing another modification of our invention.

Fig. 10 is a detail of another slight modification.

Where a power actuator is used to assist the operator in applying the brakes, it is customary to employ a power actuator having sufficient power to effect the average stopping of the vehicle without any effort of the operator beyond that necessary to operate the valve mechanism of the actuator and to overcome the customary retracting means with which the pedal or valve mechanism is provided. As this initial resistance may be made as light as desired, the operator may apply the brakes by power with very little more effort, if any, than is required to depress the foot accelerator, and the brake pedal may therefore be operated in the same manner as the accelerator pedal, that is to say, the operator may rest his heel on the floor board and operate the brake lever by merely depressing his toe. For this purpose it is desirable that the portion of the pedal which is engaged by the foot under such circumstances, which we term the primary or anti-friction foot engaging portion, be of such character as to permit the operator's foot to slip easily with respect to it with minimum degree of friction, so that the operator's foot will not be carried forward with the pedal in its descent, and his heel dragged with respect to the floor board. On the other hand, it is desirable to have the portion of the foot pedal engaged by the foot when great pressure is to be applied, so constructed as to cause a high degree of friction between the foot of the operator and the engaged surface of the pedal, so that there shall be no danger of the operator's foot slipping off of the pedal, especially as the said foot engaging portion assumes a position more nearly horizontal the further it is depressed. In order that our present invention may be clearly understood, we have shown it in connection with a power actuated brake system for an automotive vehicle, which is illustrated diagrammatically in Fig. 1. In this figure 60 represents the internal combustion engine for propelling the vehicle, provided with a throttle controlled suction passage from the carburetor, indicated at 65, to the engine cylinders, said passage including an intake manifold, 61, a vertical portion, 61ª, the latter being provided with the usual throttle valve, indicated at 64. The brake mechanism for the vehicle is illustrated at B, and may be of any desired type and applied to two or more wheels of the vehicle, as may be preferred. In the present instance the brake mechanism is illustrated diagrammatically as comprising a brake drum, 70, a brake band, 71, brake applying lever, 72, and retracting spring, 73. P represents a power actuator, which in this instance is of the type shown and described in our former Patent No. 1,583,117 granted May 4, 1926, and the particular construction of the actuator and its valve mechanism will therefore not be claimed herein. The actuator comprises a cylinder, 1, in this instance closed at both ends, and provided with a piston, 3, having a piston rod, 5, extending through one of the cylinder heads and connected by a link, 74, with the lever, 72, of the brake mechanism. The controlling valve mechanism for the actuator is in this instance located in the hub of the piston, as indicated in Fig. 2, and comprises a valve casing, 11, communicating with the cylinder forward of the piston by an aperture, or apertures, 35, and with the cylinder in rear of the piston by an aperture, or apertures, 34. The valve casing is provided with oppositely disposed valve seats, 13 and 14, engaged respectively by a suction valve, 40, and an air inlet valve, 41, the suction valve controlling the communicating aperture, or apertures, 35, and the air inlet valve, 41, controlling the admission of air or other higher pressure fluid through the valve seat, 14. The valves are conveniently formed of compressed cork, cork composition, or rubber, or other suitable material, and are supported upon a longitudinally movable valve actuating sleeve, 20, the interior of which is in this instance open to the atmosphere, the valves engaging the valve sleeve with a sealing fit, and the valve actuating sleeve being provided with collars, 40ª and 41ª, for effecting the opening of one valve after permitting the closing of the other by a movement of the sleeve in either direction, the sleeve being capable of moving through either of said valves. The valves, 40 and 41, are pressed yieldingly toward their seats by suitable means, as the spring members, 50. The valve actuating sleeve is also provided with an aperture, indicated at 24, for admitting the higher pressure fluid, in this instance atmospheric air, to the valve seat, 14.

The valve actuating sleeve extends through a stuffing box or sealing member in one head of the cylinder, and is connected by a link, 89, with the pedal lever, indicated at 88. The valve actuating sleeve is movable with and also with respect to the piston, and means are provided for limiting the relative movement between said parts. In this instance the valve actuating sleeve is shown provided with a collar, 25, within a recess in a cap, 8, secured to the hollow piston rod, 5, and adapted to engage the end of the piston rod when moved in a forwardly direction, as shown in Fig. 2. The valve actuating sleeve is also held in its rearmost position with respect to the piston by yielding means. In this instance we have shown a coil spring, 15, interposed between a collar, 16, on the interior of the hollow piston rod, and a collar, 17, on the exterior of the valve actuating sleeve, but any other suitable means may be employed for this purpose. The spring, 15, may serve as the retracting means for the pedal, 88, or a separate spring may be directly connected to the pedal, as indicated at 90, in which case the spring, 15, might be omitted, if desired.

The actuator herein shown is operated by a differential of fluid pressures obtained by air or other higher fluid pressure operating against vacuum conveniently obtained by a connection with the suction passage of the engine between the throttle valve and the engine cylinders. In this instance we have shown the forward end of the cylinder, 1, connected by a suction pipe, 62, with the intake manifold, said pipe being provided preferably with a check valve, indicated at 63, opening in a direction toward the manifold. The collars, 40ª and 41ª, are so located that when the valve actuating sleeve is in the released position, the suction valve, 40, will be opened, thus connecting the portion of the cylinder forward of the piston with the portion of the cylinder in rear of the piston through the valve chamber, 11, and aperture, or apertures, 34, thus maintaining both portions of the cylinder exhausted when the engine is running, and maintaining the piston submerged in vacuum.

It will be obvious from the foregoing that a very slight pressure on the pedal lever sufficient to overcome the initial resistance afforded by the retracting spring, or springs, will be sufficient to shift the valve mechanism so as to open the inlet valve, 41, after closing the suction valve, 40, leaving the piston subjected to suction on the forward face, and subjected to the pressure of the atmosphere or other source of higher fluid pressure on the rear face, and causing the piston to move forward and apply the brake mechanism. It will also be seen that when the brake mechanism is fully applied to the extent of the power of the actuator, the operator may, by a further movement of the pedal sufficient to take up the lost motion between the valve actuating sleeve and the piston, apply his physical force to the brake mechanism (or other part to be operated) in addition to the power of the actuator, and in like manner, he may take up this lost motion when the engine is not running or in case of failure of power, or any other reason, and directly apply the brake mechanism by his physical force alone.

As illustrated in Figs. 3, 4, 5 and 6, we provide the pedal lever, 88, with a broad foot engaging pedal portion, indicated at 91, preferably provided with a friction surface, 92, which may be obtained by roughening the surface or giving it a cover or coating of some friction material, as rubber or other suitable material, as may be desired. This surface we term the secondary or friction foot engaging surface of the pedal, which has preferably considerable area and a high coefficient of friction. The pedal is also provided with a primary foot engaging portion, which has a smaller surface area to engage the foot than the secondary or friction portion, and also has a much lower co-efficient of friction, so that the foot will readily slide over it. In Figs. 1, 3, 5 and 6 for example, we have shown the pedal provided with a transversely disposed rounded anti-friction part, indicated at 93, having a comparatively smooth surface, which is conveniently supported yieldingly with respect to the secondary foot engaging portion. In one embodiment of our invention illustrated in Figs. 3, 5 and 6, we have shown the primary foot engaging portion as a bar, 94, formed integrally with or connected with a spring plate portion, 95, having bifurcated portions, 96, extending on opposite sides of the pedal lever, 88, and riveted or otherwise secured to the bottom face of the secondary or friction foot engaging portion, as indicated at 97, the spring plate portion having a resistance greater than that of the initial resistance, which is to be overcome in moving the pedal lever to operate valve mechanism, in this instance in excess of the combined resistances of the springs, 90 and 15. It follows, therefore, that the operator can rest his heel on the floor board, indicated at 100 in Fig. 3, and by engaging the sole of his foot with the primary or anti-friction foot engaging surface, 93, of the pedal, can move the pedal forward without flexing the spring plate, portion, 95, and the foot of the operator will slide easily over the rounded comparatively smooth anti-friction surface, 93, as the pedal moves forward to operate the valve mechanism and effect an application of the brake mechanism by power. When it becomes necessary to apply the physical force of the operator to the brake mechanism, the operator will naturally apply greater force to the pedal and the spring plate member, 95, will instantly yield, and thus automatically bring the operator's foot into engagement with the secondary or friction foot engaging surface, 92, as indicated in Fig. 4, where it will be held against slipping, while the operator applies his physical force through the pedal to the brake mechanism.

In Figs. 7 and 8, we have shown a slight modification of our invention, in which the pedal lever, indicated at 188, is provided with a rigid metallic pedal portion, 188$^a$, the surface of which is provided with a secondary or friction foot engaging portion, 191, having the roughened or friction surface, 192, the part, 191, being conveniently formed of elastic or yielding material, as molded rubber, for example, with or without a reinforcing strip of spring sheet material, indicated at 191$^a$, and projecting downwardly beyond a lower edge of the rigid pedal portion, 188$^a$, where it is provided with a transversely disposed bar, 194, having a comparatively smooth rounded anti-friction surface, 193, projecting into a different plane from the corrugated surface, 192, and forming the primary foot engaging surface. The operation of this device will be the same as that previously described, except that when the operator desires to apply his physical force to the brake mechanism or other part to be operated, the additional pressure exerted on the primary foot engaging part, 194, will cause the yielding portion, 191, to bend downwardly, so as to automatically permit the foot of the operator to engage the friction surface, 192, of the secondary foot engaging part, 191, of the pedal.

In Fig. 9 we have also illustrated a further modification of our invention in which the pedal lever, 288, is provided with a rigid secondary or friction portion, 291, having a roughened surface, 292, and provided at its lower end with a secondary anti-friction foot engaging portion in the form of a transversely disposed compressible roller, 294, of rubber or other elastic material, mounted rotatably upon a pin, 294ª, secured to the rigid portion, 291, of the pedal. In this construction the pedal will be operated to effect a power stroke of the actuator by the engagement of the operator's foot with the roller, 294, as indicated in full lines in Fig. 9, and when he desires to apply his physical force to the brakes, the further pressure of his foot will cause the compressible roller, 294, to yield, and automatically bring the operator's foot into engagement with the friction surface, 291, as indicated in dotted lines in Fig. 9.

In some instances instead of having a compressible anti-friction roller mounted on a rigid shaft, we may employ a rigid roller yieldingly supported as indicated for example in Fig. 10. In this figure a metal roller, 394, is shown mounted on a pin, 394ª, carried by a yielding plate 391ª secured beneath the pedal tread, 391, and which projects below the lower edge of the rigid portion of the pedal, so that after the pedal has been moved downward by the engagement of the foot with the anti-friction roller, 394, a further pressure of the foot will depress the roller and automatically bring the operator's foot upon the friction surface of the pedal.

It will be understood that if the pedal were provided only with the friction or roughened surface, and the movement of the pedal was effected by the engagement of the sole of the operator's foot while his heel rested on the foot board to effect a power application of the brake mechanism, the frictional engagement of this roughened surface with the operator's foot would be apt to drag the operator's foot forward and change the position of his heel with respect to the floor board, and thereby interfere with the accurate control of the valve mechanism. This is prevented by our invention, and as before stated, the valve mechanism of the actuator can be operated by the pedal to effect a power application of the brake mechanism by the engagement of the operator's foot with the anti-friction surface in very much the same way that the accelerator pedal, or button, is operated, while as soon as greater pressure is exerted by the operator, the anti-friction surface will yield and automatically bring the operator's foot into engagement with the roughened secondary foot engaging portion of the pedal, whenever he desires to apply his physical force directly to the brake mechanism, thus preventing the slipping of his foot with respect to the pedal, especially when the pedal has been moved angularly to a position more or less nearly parallel with the adjacent portion of the floor board, and approaching a horizontal position.

What we claim and desire to secure by Letters Patent is:—

1. Means for actuating a part of an automotive vehicle, comprising a pedal lever, means for connecting the pedal lever with the part to be operated, and a pedal on said lever having a primary anti-friction foot engaging element constructed to permit the foot of the operator to readily move with relation thereto in moving said lever to actuate the part, and a secondary foot engaging portion having frictional properties to prevent movement of the operator's foot with respect thereto when engaged, both of said portions arranged to move the lever when acted upon by the operator's foot.

2. Means for applying brakes of automotive vehicles by power and by physical force, comprising a pedal lever connected with controlling valve mechanism and with the brakes, and having a pedal provided with a primary foot engaging portion for slidingly engaging the sole of the operator's foot, while the heel is supported to effect the operation of the brakes by power mechanism, and a secondary foot engaging portion of greater area for transmitting the physical force of the operator to the brakes.

3. Means for applying brakes of automotive vehicles by power and physical force, comprising a pedal lever connected with controlling valve mechanism and with the brakes, and having a pedal provided with a primary foot engaging portion adapted to be engaged to effect the operation of said valve mechanism, and a secondary foot engaging portion of greater area, adapted to be engaged to transmit the physical force of the operator to the brakes, said primary foot engaging portion being constructed to yield under pressure and automatically permit the operator's foot to engage said secondary foot engaging portion.

4. Means for applying brakes of automotive vehicles by power and physical force, comprising a pedal lever connected with controlling valve mechanism and with the brakes, and having a pedal provided with a primary foot engaging portion, the surface of which has a low co-efficient of friction for effecting an operation of the valve mechanism, and having a secondary foot engaging portion having a high co-efficient of friction, said primary foot engaging portion being constructed to yield under pressure and automatically permit the foot of the operator to engage said secondary foot engaging portion when applying his physical force to the brakes.

5. Means for applying brakes of automotive vehicles by power and physical force, comprising a pedal lever connected with controlling valve mechanism and with the brakes, and having a pedal provided with a rigidly supported secondary friction foot engaging portion for enabling the operator to apply his physical force to the brakes, and having adjacent to one edge of said secondary foot engaging portion a primary anti-friction foot engaging portion, the foot engaging surface of which is of less area and has a lower co-efficient of friction than the surface of said secondary foot engaging portion, and constructed to yield under pressure and automatically permit the operator's foot to engage said friction foot engaging portion in applying his physical force to the brakes.

6. Means for applying brakes of automotive vehicles by power and physical force, comprising a pedal lever connected with controlling valve mechanism and with the brakes, and having a pedal provided with a rigidly supported secondary friction foot engaging portion provided adjacent to its lower edge with a yieldingly supported primary anti-friction foot engaging portion constructed to be displaced by the pressure of the foot thereon, to permit the foot to come into contact with said secondary foot engaging portion.

7. Means for applying brakes of automotive vehicles by power and physical force, comprising a pedal lever connected with controlling valve mechanism and with the brakes, and having a pedal provided with a secondary friction foot engaging portion having a friction surface, and provided adjacent to its lower edge with a primary anti-friction foot engaging portion, the surface of which has a lower co-efficient of friction, said primary foot engaging portion being yieldingly supported with respect to the pedal, and adapted to be displaced by a pressure of the foot thereon, to permit the foot to engage said secondary foot engaging portion.

8. Means for applying brakes of automotive vehicles by power and physical force, comprising a pedal lever connected with controlling valve mechanism and with the brakes, and having a pedal provided with a secondary friction foot engaging portion rigidly secured thereto, and having adjacent to its lower edge a primary anti-friction foot engaging portion supported in operative position by yielding means having greater resistance than retracting means for the pedal and valve mechanism, whereby said primary anti-friction foot engaging portion may be engaged by the foot of the operator to operate said valve mechanism and effect a power application of the brakes, and will yield to permit the operator's foot to be applied to said secondary friction foot engaging portion to apply the physical force of the operator directly to the brakes.

9. Means for applying brakes of automotive vehicles by power and physical force, comprising a pedal lever connected with controlling valve mechanism and with the brakes, retracting means for said pedal lever, said lever provided with a pedal provided with a rigidly supported secondary friction foot engaging portion having a friction surface, and provided adjacent to the lower edge thereof with a secondary anti-friction foot engaging portion, having a comparatively smooth surface projecting forwardly of said friction surface and supported in operative position by yielding means having greater resistance than the retracting means for the pedal, whereby the operator may operate the valve mechanism by engaging the anti-friction portion to effect a power application of the brakes, and may displace said primary foot engaging portion to engage said secondary foot engaging portion, to apply his physical force to the brakes.

10. Means for applying brakes of automotive vehicles by power and physical force, comprising a pedal lever connected with controlling valve mechanism and with the brakes, and having a pedal provided with a rigidly supported secondary friction foot engaging portion having a friction surface, and having adjacent to the lower edge thereof a primary anti-friction foot engaging portion in operative position, and having sufficient power to overcome the initial resistance to the movement of said pedal lever and valve mechanism.

11. Means for applying brakes of automotive vehicles by power and physical force, comprising a pedal lever connected with controlling valve mechanism and with the brakes, and having a pedal provided with a rigidly supported secondary friction foot engaging portion having a friction surface, a spring plate member rigidly connected therewith and provided with a primary anti-friction foot engaging portion supported adjacent to the lower edge of the secondary foot engaging portion, and having a rounded substantially smooth foot engaging surface, said spring plate member having greater resistance than retracting means for the pedal lever and valve mechanism.

12. A pedal lever having a pedal provided with a friction foot engaging portion, and an anti-friction foot engaging portion constructed to yield under pressure, to automatically permit the foot of the operator to engage said friction portion, both of said portions arranged to move the lever when acted on by the foot of the operator.

13. A pedal lever having a pedal provided with a friction portion and an anti-friction portion projecting forward of the plane of the friction portion and constructed to yield to automatically permit the operator's foot to engage the said friction portion, both of said portions arranged to move the lever when acted on by the foot of the operator.

14. A pedal lever having a pedal provided with friction foot engaging portion, and an anti-friction foot engaging portion located adjacent to one edge of the friction portion, projecting forwardly thereof and constructed to yield under pressure to permit the operator's foot to engage said friction portion, both of said portions arranged to move the lever when acted on by the foot of the operator.

15. A pedal lever having a pedal provided with a friction foot engaging portion, and an anti-friction foot engaging portion located adjacent to one edge of the said friction portion yieldingly connected with the pedal and projecting forward of said friction portion and adapted to yield under pressure to automatically permit the operator's foot to engage the said friction portion of the pedal, both of said portions arranged to move the lever when acted on by the foot of the operator.

In testimony whereof we affix our signatures.

CALEB S. BRAGG.
VICTOR W. KLIESRATH.